US008316261B2

(12) United States Patent
Pfeiffer et al.

(10) Patent No.: US 8,316,261 B2
(45) Date of Patent: Nov. 20, 2012

(54) METHOD FOR RUNNING A COMPUTER PROGRAM ON A COMPUTER SYSTEM

(75) Inventors: Wolfgang Pfeiffer, Grossbottwar (DE); Rienhard Weiberle, Vaihingen/Enz (DE); Bernd Mueller, Gerlingen (DE); Florian Hartwich, Reutlingen (DE); Werner Harter, Illingen (DE); Ralf Angerbauer, Schwieberdingen (DE); Eberhard Boehl, Reutlingen (DE); Thomas Kottke, Ehningen (DE); Yorck von Collani, Beilstein (DE); Rainer Gmehlich, Ditzingen (DE); Karsten Graebitz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 11/662,611

(22) PCT Filed: Sep. 12, 2005

(86) PCT No.: PCT/EP2005/054513
§ 371 (c)(1),
(2), (4) Date: Nov. 6, 2007

(87) PCT Pub. No.: WO2006/032617
PCT Pub. Date: Mar. 30, 2006

(65) Prior Publication Data
US 2008/0201618 A1    Aug. 21, 2008

(30) Foreign Application Priority Data
Sep. 25, 2004   (DE) .......................... 10 2004 046 611

(51) Int. Cl.
*G06F 11/00* (2006.01)

(52) U.S. Cl. ...................................... 714/38.1; 717/124
(58) Field of Classification Search ........................ None
See application file for complete search history.

(56) References Cited

U.S. PATENT DOCUMENTS

| | | | |
|---|---|---|---|
| 5,155,729 A * | 10/1992 | Rysko et al. ................... 714/11 |
| 5,619,409 A | 4/1997 | Schultz et al. |
| 5,895,434 A | 4/1999 | Fennel et al. |
| 5,928,369 A | 7/1999 | Keyser et al. |
| 6,012,148 A * | 1/2000 | Laberge et al. .................. 714/2 |
| 6,275,752 B1 * | 8/2001 | Giers .............................. 701/29 |
| 6,393,582 B1 * | 5/2002 | Klecka et al. .................. 714/11 |
| 6,615,374 B1 * | 9/2003 | Moran ............................ 714/48 |
| 6,625,749 B1 | 9/2003 | Quach |
| 6,931,571 B2 * | 8/2005 | Bernadat et al. ................ 714/25 |
| 6,948,092 B2 * | 9/2005 | Kondo et al. ................... 714/12 |
| 6,950,978 B2 * | 9/2005 | Arndt et al. ................... 714/800 |
| 7,058,927 B2 * | 6/2006 | Yenne et al. .................. 717/128 |
| 7,134,047 B2 * | 11/2006 | Quach ............................. 714/11 |
| 7,194,671 B2 * | 3/2007 | Tu et al. ........................ 714/744 |
| 7,251,755 B2 * | 7/2007 | Joshi et al. ..................... 714/43 |
| 7,263,631 B2 * | 8/2007 | VanBuren ....................... 714/15 |

(Continued)

FOREIGN PATENT DOCUMENTS

DE     100 56 408     3/2002

(Continued)

*Primary Examiner* — Christopher McCarthy
(74) *Attorney, Agent, or Firm* — Kenyon & Kenyon LLP (57) ABSTRACT

Errors which may be detected by an error detection unit may occur during execution of a computer program which runs on a computer system and includes at least one run-time object. In order to handle a detected error particularly flexibly and to keep the computer system available as much as possible, an error handling routine is selected from a pre-selectable set of error handling routines as a function of an identifier assigned to the run-time object and the selected error handling routine is executed.

25 Claims, 3 Drawing Sheets

U.S. PATENT DOCUMENTS

| | | | |
|---|---|---|---|
| 7,418,618 B2 * | 8/2008 | Huang | 714/2 |
| 2002/0138788 A1 * | 9/2002 | Yenne et al. | 714/38 |
| 2002/0144177 A1 * | 10/2002 | Kondo et al. | 714/13 |
| 2004/0078650 A1 * | 4/2004 | Safford et al. | 714/11 |
| 2005/0223365 A1 * | 10/2005 | Smith et al. | 717/128 |

FOREIGN PATENT DOCUMENTS

| | | |
|---|---|---|
| EP | 1164590 | 12/2001 |
| JP | 6-35758 | 2/1994 |
| JP | 9-120368 | 5/1997 |
| JP | 10-508554 | 8/1998 |
| JP | 11-259340 | 9/1999 |
| JP | 2004-514215 | 5/2004 |
| WO | WO 96/14226 | 5/1996 |
| WO | WO0075923 | 12/2000 |
| WO | WO 02/41148 | 5/2002 |
| WO | WO 2006/032585 | 3/2006 |

* cited by examiner

METHOD FOR RUNNING A COMPUTER PROGRAM ON A COMPUTER SYSTEM

FIELD OF THE INVENTION

The present invention relates to a method for running a computer program on a computer system including at least one processor. The computer program includes at least one run-time object. An error occurring during execution of the run-time object is detected by an error detection unit. When an error is detected, the error detection unit generates an error detection signal.

The present invention also relates to a computer system on which a computer program is executable. The computer program includes at least one run-time object. An error occurring during execution of the run-time object on the computer system is detectable by an error detection unit.

The present invention also relates to a computer program capable of running on a computer system and a machine-readable data medium on which a computer program is stored.

BACKGROUND INFORMATION

Errors may occur when running a computer program on a computer. Errors may be differentiated according to whether they are caused by the hardware (processor, bus systems, peripheral equipment, etc.) or by the software (application programs, operating systems, BIOS, etc.).

When errors occur, a distinction is made between permanent errors and transient errors. Permanent errors are always present and are based on defective hardware or defectively programmed software, for example. In contrast with these, transient errors occur only temporarily and are also much more difficult to reproduce and predict. In the case of data stored, transmitted, and/or processed in binary form, transient errors occur, for example, due to the fact that individual bits are altered due to electromagnetic effects or radiation ($\alpha$-radiation, neutron radiation).

A computer program is usually subdivided into multiple run-time objects that are executed sequentially or in parallel on the computer system. Run-time objects include, for example, processes, tasks, or threads. Errors occurring during execution of the computer program may thus be assigned in principle to the run-time object being executed.

Handling of permanent errors is typically based on shutting down the computer system or at least shutting down subsystems. However, this has the disadvantage that the functionality of the computer system or the subsystem is then no longer available. To nevertheless be able to ensure reliable operation, in particular in a safety-relevant environment, the subsystems of a computer system are designed to be redundant, for example.

Transient errors are frequently also handled by shutting down subsystems. It is also known that when transient errors occur, one or more subsystems should be shut down and restarted and it is then possible to infer that the computer program is now running error-free by performing a self-test, for example. If no new error is detected, the subsystem resumes its work. It is possible here for the task interrupted by the error and/or the run-time object being processed at that time not to be executed further (forward recovery). Forward recovery is used in real-time-capable systems, for example.

With non-real-time-capable applications in particular, it is known that checkpoints may be used at preselectable locations in a computer program and/or run-time object. If a transient error occurs and the subsystem is consequently restarted, the task is resumed at the checkpoint processed last. Such a method is known as backward recovery and is used, for example, with computer systems that are used for performing transactions in financial markets.

The known methods for handling transient errors have the disadvantage that the entire computer system, or at least subsystems, is unavailable temporarily, which may result in data loss and delay in running the computer program.

Therefore an object of the present invention is to handle an error occurring in running a computer program on a computer system in the most flexible possible manner and thereby ensure the highest possible availability of the computer system.

SUMMARY OF THE INVENTION

To achieve this object against the background of the method of the type defined in the introduction, it is provided that an error handling routine is selected from a preselectable set of error handling routines as a function of an identifier assigned to the run-time object and the selected handling routine is executed.

According to the present invention, an identifier is assigned to one or multiple run-time objects which are executed on the computer system, the identifier in turn identifying at least one error handling routine. If an error occurs during execution of the run-time object, the error handling routine corresponding to the identifier of the run-time object is selected and executed. For example, this identifier may already be established during programming of the run-time object or during installation of the run-time object on the computer system. This makes it possible to determine the error handling routine to be executed in the event of occurrence of an error already during programming of the computer system or during installation of the computer program on the computer system.

For example, a run-time object which relates to a safety-relevant and/or time-critical function may be assigned a different identifier than the run-time object which relates to a non-real time-capable function. This makes very flexible handling of occurring errors of different run-time objects possible.

Using the method according to the present invention, it may be achieved in particular that a sub-system or even the entire computer system does not have to be restarted when an error occurs during execution of a run-time object. Moreover, a flexible selection of an error handling mechanism is possible, thereby clearly increasing the availability of the overall system.

According to an advantageous refinement of the method according to the present invention, the error handling routine is additionally selected as a function of the error detection signal generated by the error detection unit. The error detection unit may determine, for example, whether it is a hardware error or a software error and which hardware unit (processor, bus system, memory, etc.) has triggered the error. Furthermore, it is possible that the error detection unit determines whether the occurring error is a permanent error or rather a transient error. For this purpose, the error detection unit may provide a counter for each run-time object which counts the number of occurring errors. If exceptionally many errors occur during execution of a certain run-time object, the error detection unit may infer a permanent error and may generate a different error detection signal than when the counter shows only a very low value. It is conceivable in particular that the error detection signal contains information about an ascertained variable, for example the instantaneous counter content of the number of errors which have occurred so far during execution of the run-time object. This makes a particularly flexible selection of an error detection routine possible.

If the computer system includes, for example, multiple processors, based on the error detection signal, that processor is identifiable on which the run-time object has been executed and the error has occurred. If one and the same run-time object runs on multiple different processors, for example, and if these processors are assigned to different environments of different safety relevance, then different error handling routines may be selected when an error occurred during execution of the run-time object depending on which processor the run-time object has been executed, even though the run-time object is always assigned the same identifier.

If multiple processors have a redundant design and if the run-time object is redundantly executed on these processors, error handling may provide, for example, that the result, which is made available by that processor on which the error occurred, is ignored during further handling (e.g., during a voting subsequently to be carried out), thereby making an even more flexible handling of occurring errors possible.

Error handling is advantageously carried out as a function of at least one variable characterizing the executed run-time object and/or the execution of the run-time object. Such a variable may be a priority assigned to the run-time object, for example. This makes it possible to additionally carry out error handling as a function of the priority of the executed run-time object.

A variable characterizing the execution of the run-time object may also indicate the already elapsed or the still available run time. For example, if the error occurs shortly after loading the run-time object it may be provided to reload and to re-execute the entire run-time object. However, if the run-time object is already near the end of the available run time, or if another run-time object is to be urgently executed, it may be provided that the run-time object during whose execution the error occurred is simply terminated.

The variable characterizing the execution of the run-time object may also indicate whether a data exchange with other run-time objects or a memory access has already taken place. This may then be taken into account by the selection of the error handling routine.

The computer system includes multiple processors in a preferred embodiment of the method according to the present invention. The run-time object is redundantly executed on at least two of the processors. A comparison of the redundantly generated results of the at least two processors is carried out and an error detection signal is generated when the results do not match.

A computer system including multiple processors is referred to as a dual core architecture (two processors) or as a multiprocessor architecture (multiple processors), for example. Using the method according to the present invention, it is possible to carry out particularly flexible error handling in particular during the redundant execution of run-time objects.

The method is preferably used in a motor vehicle, in a motor vehicle control unit in particular, or in a safety-relevant system. Safety-relevant systems are used for steering aircraft, for example. It is particularly important in these areas to handle transient errors systematically and flexibly, thereby achieving an as great as possible availability of the respective system.

An operating system advantageously runs on at least one processor of the computer system, the analysis of the identifier and/or the analysis of the error detection signal and/or the selection of the error handling routine being carried out by the operating system. This enables particularly rapid and reliable processing of detected errors, since operating systems typically have access to the resources necessary for handling errors which have occurred. For example, operating systems have a scheduler that decides which run-time object is executed at which time on a processor. This makes it possible for an operating system to terminate a run-time object particularly quickly, to restart it, or to start an error handling routine instead of the run-time object.

According to a preferred embodiment of this method, at least one of the error handling routines in the preselectable set of error handling routines implements one of the following error handling options:

Performing no operation:
An error that occurs is ignored.
Termination of execution of the run-time object:
Execution of the run-time object is terminated and another run-time object is executed instead.
Termination of execution of the run-time object and prohibition of reactivation of the run-time object:
The run-time object during the execution of which the error occurred will consequently not be executed again.
Repeating the execution of the run-time object.
Backward recovery: Checkpoints are set and when an error occurs during execution of the run-time object, the routine jumps back to the last checkpoint.
Forward recovery: Execution of the run-time object is interrupted and resumed at another downstream point or the run-time object is re-initialized and started using updated input data.
Reset: The entire computer system or a subsystem is restarted.

These error handling routines allow a particularly flexible handling of errors.

The method according to the present invention is preferably used for handling transient errors. However, the choice of error handling routine is advantageously made as a function of whether the error detected is a transient error or a permanent error.

When a permanent error is detected, it may be handled, for example, by no longer executing the particular run-time object or by permanently shutting down a subsystem. However, when a transient error is detected, it may be simply ignored or handled via a forward recovery.

A hardware test is advantageously carried out via a test routine. The error detection signal is then generated as a function of the result of the execution of the test routine. This makes it possible to detect a hardware defect particularly reliably and a permanent error may be inferred.

In a preferred embodiment, different identifiers are assigned to the run-time object for different types of errors. For example, if a permanent error is detected during execution of a run-time object, a different error handling routine may be selected than if a transient error occurs during execution of the run-time object.

Furthermore, different identifiers for different run-time environments may be assigned to the run-time object. For example, a run-time object may be assigned an identifier for execution in a safety-relevant environment, another identifier for redundant execution on a redundantly designed processor, and additionally another identifier for execution in a time-critical environment. This embodiment enables even more flexible handling of an error which occurred during execution of a run-time object and may again increase the availability.

The object is also achieved via a computer system of the type mentioned above by assigning an identifier to the run-time object and an executable error handling routine is selectable from a pre-selectable set of error handling routines as a function of the identifier.

The implementation of the method according to the present invention in the form of a computer program is of particular importance. The computer program is capable of running on a computer system, in particular on a processor, and is programmed for executing the method according to the present invention. In this case, the present invention is implemented by the computer program so that the computer program represents the present invention in the same way as does the method for the execution of which the computer program is suitable. The computer program is preferably stored on a machine-readable data medium. For example, a random access memory, a read-only memory, a flash memory, a digital versatile disk, or a compact disk may be used as the machine-readable data medium.

BRIEF DESCRIPTION OF THE DRAWINGS

Additional possible applications and advantages of the present invention are derived from the following description of exemplary embodiments which are depicted in the drawing.

DETAILED DESCRIPTION

Figure 1:
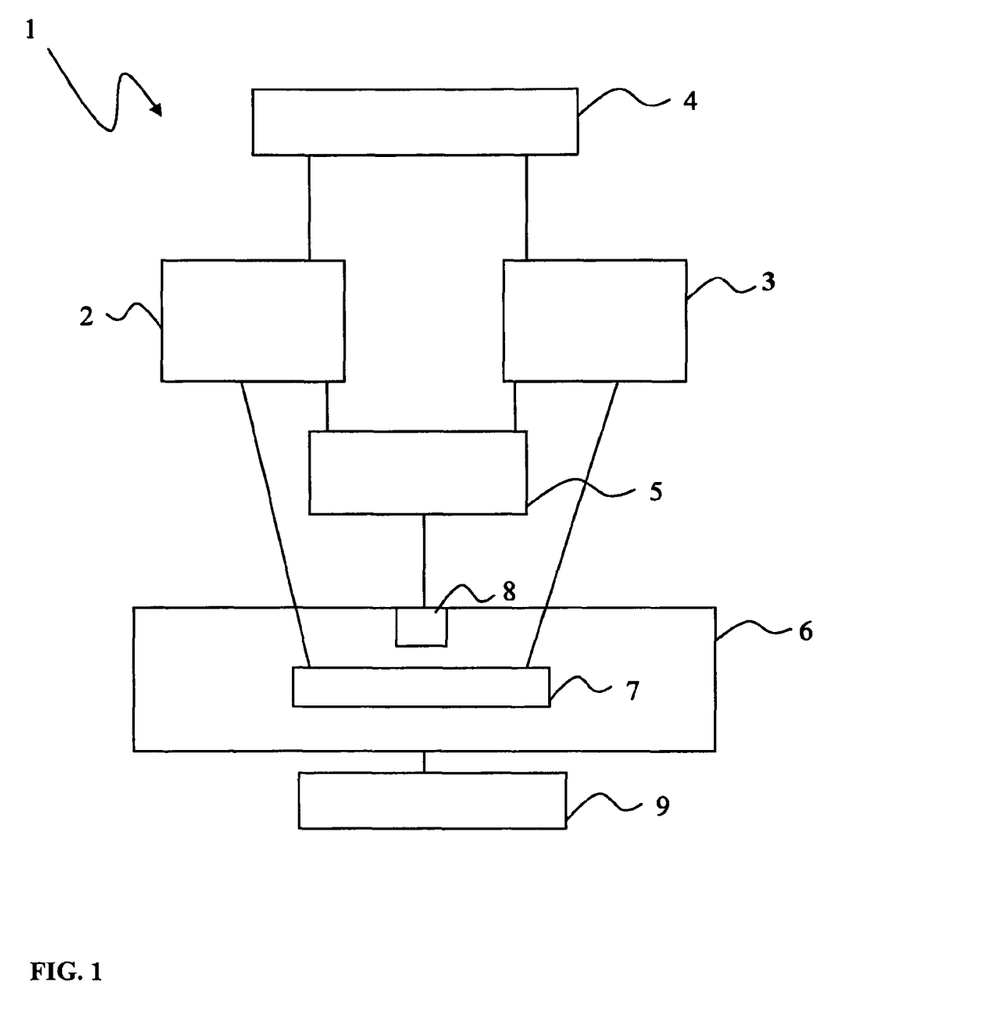
FIG. 1 shows a schematic diagram of components of a computer system for performing the method according to the present invention.

FIG. 1 shows a schematic diagram of a computer system 1 suitable for performing the method according to the present invention. Computer system 1 has two processors 2, 3. The processors may be, for example, complete processors (CPUs) (dual-core architecture). The dual-core architecture allows two processors 2, 3 to be operated redundantly in such a way that a process, i.e., a run-time object, is executed almost simultaneously on both processors 2, 3. Processors 2, 3 may also be arithmetic logic units (ALUs) (dual-ALU architecture).

A shared program memory 4 and an error detection unit 5 are assigned to both processors 2, 3. Multiple executable run-time objects are stored in program memory 4. Error detection unit 5 is designed as a comparator, for example, making it possible to compare values calculated by processors 2 and 3.

To implement the basic control of computer system 1, an operating system 6 runs on computer system 1. Operating system 6 has a scheduler 7 and an interface 8. Scheduler 7 manages the computation time made available by processors 2, 3 by deciding when which process or which run-time object is executed on processors 2 and 3. Interface 8 allows error detection unit 5 to report detected errors to operating system 6 via an error detection signal.

Operating system 6 has access to a memory area 9. Memory area 9 includes for each executable run-time object the identifier(s) assigned to this run-time object. It is possible to map memory area 9 and program memory 4 on one and the same memory element as well as on different memory elements. The memory element(s) may be, for example, a working memory or a cache assigned to processor 2 and/or processor 3.

Various other embodiments of computer system 1 are also conceivable. For example, computer system 1 might have only one processor. An error in processing a run-time object might then occur, for example, by error detection unit 5 using a plausibility checks.

In particular, one and the same run-time object could be executed several times in succession on processor 2, 3. Error detection unit 5 could then compare the results generated in each case and when a deviation in results is found, it could then infer the existence of an error.

Furthermore it is conceivable for computer system 1 to have more than two processors 2, 3. A run-time object could then be executed redundantly on three of the existing processors 2, 3, for example. By comparing the results obtained in this way, error detection unit 5 could then detect the existence of an error.

Figure 2:
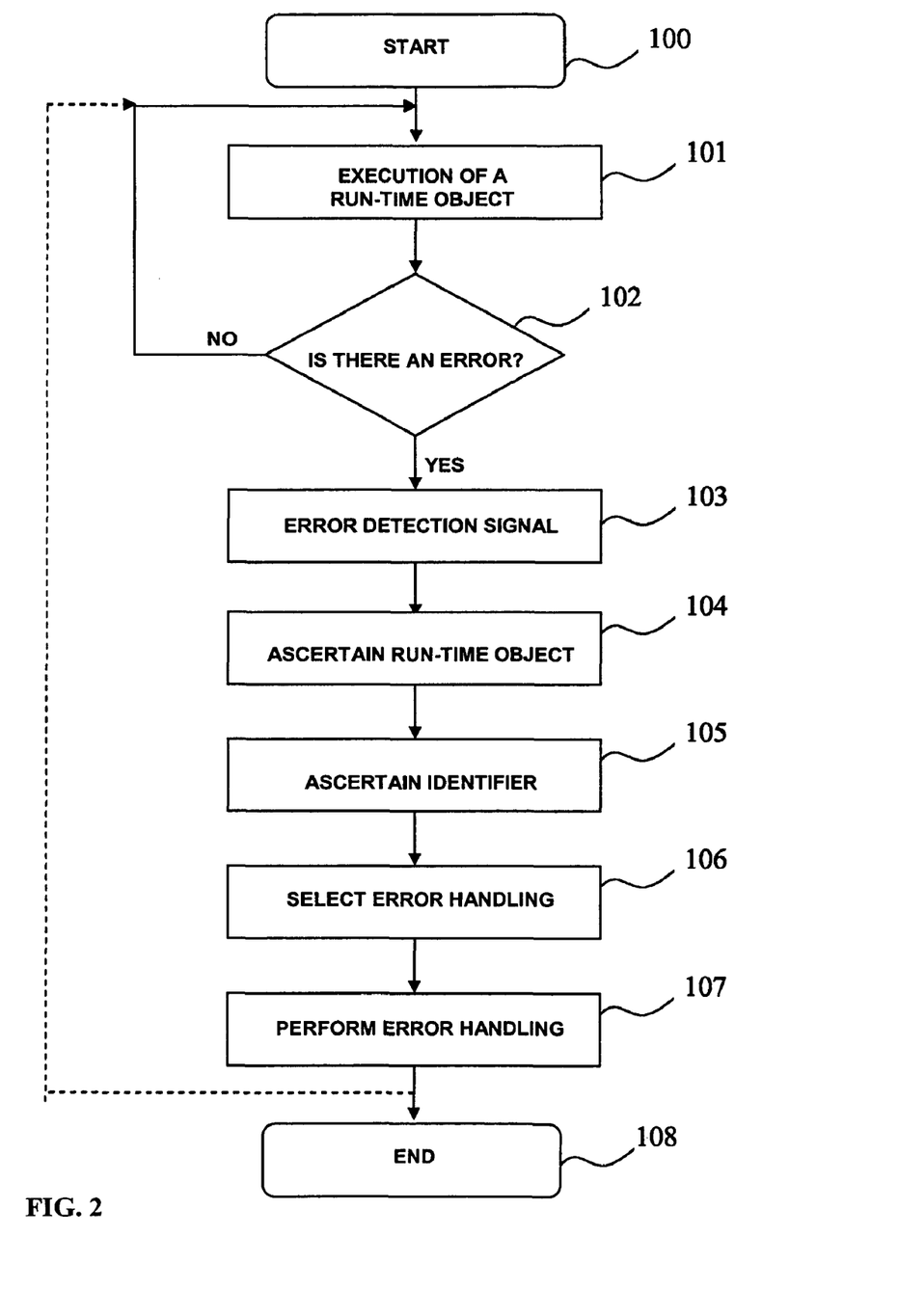
FIG. 2 shows a flow chart for schematically illustrating the method according to the present invention in a first embodiment.

FIG. 2 shows a flow chart of the method according to the present invention in schematic form. The method begins with a step 100. In step 101, scheduler 7 triggers processors 2, 3 to read out and execute a run-time object from program memory 4.

Step 102 checks on whether there is an error in executing the run-time object. This is done, for example, by error detection unit 5 which compares the results calculated redundantly by processors 2, 3. If an error is found, the routine branches back to step 101 and an additional run-time object is executed in processors 2, 3.

However, if an error is detected in step 102, then in a step 103 an error detection signal is generated by an error detection unit and transmitted to operating system 6 via interface 8.

Operating system 6 ascertains the erroneous run-time object in a step 104. This information may be received from scheduler 7, for example.

The identifier, assigned to the run-time object ascertained in step 104, is ascertained in a step 105. For example, a table may be stored in memory area 9 for this purpose in which the identifier assigned to each executable run-time object is stored.

Furthermore, it is possible that the identifier assigned to the run-time object is stored together with the run-time object itself in program memory 4. If a run-time object is loaded into processor 2, 3 for execution the identifier may be stored in a memory area, e.g., a register, which is assigned to the respective processor 2, 3. In this case, operating system 6 could request the identifier of the run-time object from the respective processor 2, 3.

It is also conceivable that the error detection unit ascertains the identifier assigned to the run-time object and, together with the error detection signal, e.g., as a parameter, makes it available to the operating system via interface 8.

An error handling routine is selected in a step 106 as a function of the error detection signal and the identifier assigned to the run-time object. The identifier assigned to the run-time object may unambiguously determine the error handling routine to be selected. For example, the identifier may determine that the erroneous run-time object is to be terminated and not reactivated. The identifier may likewise determine that the system should jump back to a pre-selected checkpoint and that the run-time object should be re-executed from there (backward recovery).

Furthermore, the identifier may determine that a forward recovery is carried out, that the execution of the run-time object is repeated, or that no further error handling should be carried out.

It is particularly advantageous if information about the type of error that has occurred is to be derived from the error detection signal transmitted by error detection unit 5 to operating system 6. The type of error may indicate, for example, whether it is a transient error or a permanent error. Moreover, the error signal may be designed in such a way that information is derivable indicating on which processor 2, 3 the error occurred. Multiple identifiers may be assigned to the run-time object, for example. A first identifier may indicate the error handling routine to be executed when a permanent error occurs. A second identifier, in contrast, indicates the error handling routine to be executed when a transient error occurs. Consequently, this permits even more flexible error handling.

In particular when computer system 1 is designed as a multiprocessor system or as a multi-ALU system, it may be advantageous to make the selection of the error handling routine depend upon whether the run-time object is executed on one or more processors or ALUs. This information could be obtained from the error detection signal, for example. The run-time object could have different identifiers for cases in which the run-time object is erroneously executed on only one processor 2, 3 and in which the run-time object is erroneously executed on multiple processors 2, 3.

In a step 107, the error handling is performed by executing the error handling routine selected by operating system 6. The operating system may prompt scheduler 7, for example, to terminate all run-time objects currently being executed on processors 2, 3, discard all calculated values, and restart the run-time objects as a function of the selected error handling routine. The method according to the present invention for error handling stops in a step 108. However, the run of a program, shown in FIG. 2, including a sequential execution of run-time objects and a subsequent check for the presence of an error is not inevitably terminated at this point. If the run of the program is not yet terminated when step 108 is reached, the system may jump back to step 101 (dashed line).

Figure 3:
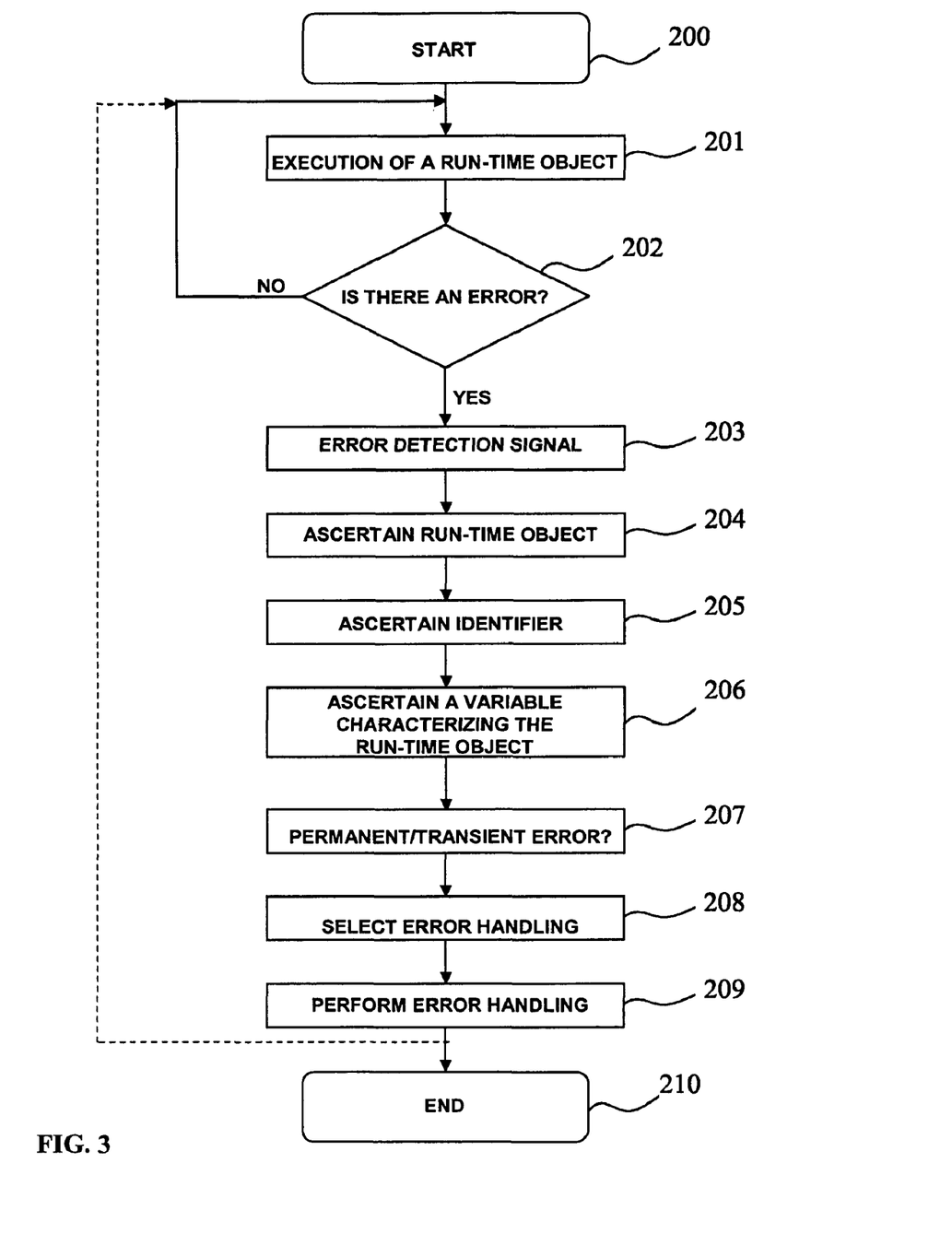
FIG. 3 shows a flow chart for schematically illustrating the method according to the present invention in a second embodiment.

FIG. 3 schematically shows another embodiment of the method according to the present invention in the form of a flow chart in which additional variables have been taken into account in selecting the error handling routine to be performed.

The method begins with a step 200. Steps 201 through 205 may correspond to steps 101 through 105 depicted in FIG. 2 and described in conjunction with it.

In a step 206, a variable characterizing the run-time object, i.e., the execution of the run-time object, is ascertained. A variable characterizing the run-time object may describe, for example, a safety relevance assigned to this run-time object. A variable characterizing the run-time object may also describe whether the variables calculated by the present run-time object are needed by other run-time objects and if so, which ones and/or whether the variables calculated by the present run-time object depend on other run-time objects and if so, which. Thus interdependencies of run-time objects on one another may be described.

The variable characterizing the execution of a run-time object may also describe, for example, whether there has already been memory access by the run-time object at the time when an error occurred, whether the error occurred a relatively short time after loading the run-time object, whether the variables to be calculated by the run-time object are urgently needed by other run-time objects and/or how much time is still available for execution of the run-time object. These variables may then be taken into account in a selection of the error handling routine. If, for example, there is no longer enough time available to re-execute the entire run-time object a backward recovery or a forward recovery may be carried out.

A step 207 ascertains whether there is a permanent error or a transient error. For example, error counters may be included, indicating how often an error occurs during execution of a certain run-time object. If it occurs with particular frequency or even always, a permanent error may be assumed.

Steps 206 and 207 are initially independent from one another and may be executed individually. However, an execution in reverse sequence is also possible. Moreover, it is conceivable that the variable characterizing the run-time object or the execution of the run-time object which is ascertained in step 206 is used as an input value for ascertaining the type of error in step 207. In this case, both steps 206 and 207 must be executed in the established sequence. Finally, steps 206 and 207 do not necessarily have to be executed sequentially; they may also be executed in parallel.

Furthermore, it is possible to assign an error counter to an individual hardware unit of computer system 1, i.e., to a processor 2, 3, for example. If it is detected, for example, that the execution of a particularly large number of run-time objects is erroneous on a processor 2, 3 of computer system 1, the existence of a permanent error (e.g., a hardware error) may be inferred.

In a step 208 an error handling routine is selected. To do so, the variables ascertained in steps 205 through 207, in particular one or more identifiers assigned to the defective run-time object, one or more variables characterizing the run-time object and/or the execution of the run-time object, and the type of error occurring are taken into account.

The error handling routine is selected by operating system 6, for example. The choice may be made by using the aforementioned variables in a type of decision tree.

Error handling is carried out in a step 209 and the method according to the present invention for error handling is terminated in a step 210. However, the run of a program including sequential execution of run-time objects and a subsequent check for the existence of an error depicted in FIG. 3 is not necessarily terminated too at this point. If the run of the program is not yet terminated when step 210 is reached, the system may jump back to step 201 (dashed line).

It is consequently possible using the method according to the present invention to establish already during programming and/or during implementation or installation of a run-time object on the computer system which error handling routine is to be executed when an error occurs. This permits particularly flexible error handling adapted to the executed run-time object. According to the present invention, multiple identifiers may be assigned to one run-time object. This permits an even more flexible choice of an error handling routine.

A variable characterizing the type of error (transient/permanent), a variable characterizing the run-time object itself, or a variable characterizing the execution of the run-time object may preferably be used for selecting the error handling routine. Furthermore, information ascertained by error detection unit 5, e.g., the identity of processors 2, 3 on which the run-time object has been executed during occurrence of the error, may be taken into account in selecting the error handling routine. The safety relevance of the run-time object at the instantaneous execution point in time may be inferred from the information about whether the considered run-time object has been executed on only one processor 2, 3 or is executed on both processors 2, 3 simultaneously. Furthermore, it is possible to use additional information of the computer system and/or the periphery of the computer system (e.g., current value range of sensor variables and/or the value range of the output variables) for assessing the instantaneous safety relevance of the run-time environment. This permits even more flexible error handling on a computer system.

While performing the error handling in steps 107 and/or 209, it is also possible to check on whether, for example, a new execution of the erroneous run-time object prompted by the error handling routine is again resulting in an error. In this case, it is possible to provide for an error handling routine, but a different one this time, to be selected again. For example, it is possible in this case to provide for the entire system or a subsystem to be shut down.

FIG. 2
100 Start
101 Execution of a run-time object
nein=no
102 Is there an error?
ja=yes
103 Error detection signal
104 Ascertain run-time object
105 Ascertain identifier
106 Select error handling
107 Perform error handling
108 End
FIG. 3
200 Start
201 Execution of a run-time object
nein=no
202 Is there an error?
ja=yes
203 Error detection signal
204 Ascertain run-time object
205 Ascertain identifier
206 Ascertain a variable characterizing the run-time object
207 Permanent/transient error?
208 Select error handling
209 Perform error handling
210 End

What is claimed is:

1. A method for running a computer program on a computer system having at least one processor, the computer program having at least one run-time object, the method comprising:
   detecting, using an error detection unit, an error occurring during the execution of the run-time object;
   determining, at the error detection unit, whether the error is permanent or transient based on an error count provided by a counter;
   generating using the error detection unit, an error handling signal when the error occurs;
   assigning an identifier to one or more run-time objects being executed on the computer system;
   selecting an error handling routine from a preselectable set of error handling routines as a function of the identifier assigned to the run-time object and the determination of whether the error is permanent or transient; and
   executing the selected error handling routine;
   wherein for each run-time object, the counter counts the number of occurring errors so that if a number of errors occur during execution of a certain run-time object, the error detection unit may infer a permanent error.

2. The method as recited in claim 1, wherein the error handling routine is additionally selected as a function of the error handling signal.

3. The method as recited in claim 1, wherein error handling is carried out as a function of at least one variable characterizing the executed run-time object and/or the execution of the run-time object.

4. The method as recited in claim 1, wherein the computer system includes multiple processors, wherein the run-time object is redundantly executed on at least two of the processors, wherein a comparison of the redundantly produced results of the at least two processors is carried out, and wherein an error detection signal is generated when the results do not match.

5. The method as recited in claim 1, wherein the method is used in a motor vehicle control unit.

6. The method as recited in claim 1, wherein the method is used in a safety-relevant system.

7. The method as recited in claim 1, wherein an operating system runs on at least one processor of the computer system, and the analysis of the identifier and/or the analysis of the error detection signal and/or the selection of the error handling routine are carried out by the operating system.

8. The method as recited in claim 1, wherein at least one of the error handling routines implements one of the following error handling options in the pre-selectable set of error handling routines:
   a. performing no operation;
   b. terminating execution of the run-time object;
   c. terminating execution of the run-time object and prohibiting a new activation of the run-time object;
   d. repeating the execution of the run-time object;
   e. backward recovery;
   f. forward recovery; and
   g. reset.

9. The method as recited in claim 1, wherein the error that occurs is a transient error.

10. The method as recited in claim 1, wherein a hardware test is carried out via a test routine and the error detection signal is generated as a function of the result of the execution of the test routine.

11. The method as recited in claim 1, wherein for different types of errors and/or for different run-time environments, different identifiers are assigned to the run-time object.

12. The method as recited in claim 1, wherein the error handling routine is additionally selected as a function of the error handling signal, wherein error handling is carried out as a function of at least one variable characterizing the executed run-time object and/or the execution of the run-time object, wherein the computer system includes multiple processors, wherein the run-time object is redundantly executed on at least two of the processors, wherein a comparison of the redundantly produced results of the at least two processors is carried out, and wherein an error detection signal is generated when the results do not match.

13. The method as recited in claim 12, wherein an operating system runs on at least one processor of the computer system, and at least one of the analysis of the identifier, the analysis of the error detection signal, and the selection of the error handling routine are performed by the operating system.

14. The method as recited in claim 12, wherein at least one of the error handling routines implements one of the following error handling options in the pre-selectable set of error handling routines:
   a. performing no operation;
   b. terminating execution of the run-time object;
   c. terminating execution of the run-time object and prohibiting a new activation of the run-time object;
   d. repeating the execution of the run-time object;
   e. backward recovery;
   f. forward recovery; and
   g. reset.

15. The method as recited in claim 12, wherein the error that occurs is a transient error.

16. The method as recited in claim 12, wherein a hardware test is performed via a test routine and the error detection signal is generated as a function of the result of the execution of the test routine, and wherein for at least one of different types of errors and different run-time environments, different identifiers are assigned to the run-time object.

17. The method as recited in claim 1, further comprising:
   determining, at the error detection unit, whether the error is in hardware or software based on a trigger of the error; and
   selecting the error handling routine as a function of the determination of whether the error is in hardware or software.

18. The method as recited in claim 17, wherein the error detection unit determines whether it is a hardware error or a software error, taking into account which hardware unit has triggered the error.

19. A non-transitory computer readable medium storing a computer program, which has at least one run-time object and which is executable on a computer, comprising:
   a program code arrangement having program code for performing the following:
      detecting, using an error detection unit, an error occurring during the execution of the run-time object;
      determining, at the error detection unit, whether the error is permanent or transient based on an error count provided by a counter;
      generating using the error detection unit, an error handling signal when the error occurs;
      assigning an identifier to one or more run-time objects being executed on the computer system;
      selecting an error handling routine from a preselectable set of error handling routines as a function of the identifier assigned to the run-time object and the determination of whether the error is permanent or transient; and
      executing the selected error handling routine;
      wherein for each run-time object, the counter counts the number of occurring errors so that if a number of errors occur during execution of a certain run-time object, the error detection unit may infer a permanent error.

20. The non-transitory computer readable medium as recited in claim 19, wherein the computer program includes an operating system.

21. The non-transitory computer readable medium as recited in claim 19, wherein the program code arrangement includes program code for performing the following:
   determining, at the error detection unit, whether the error is in hardware or software based on a trigger of the error; and
   selecting the error handling routine as a function of the determination of whether the error is in hardware or software.

22. The non-transitory computer readable medium as recited in claim 21, wherein the error detection unit determines whether it is a hardware error or a software error, taking into account which hardware unit has triggered the error.

23. A computer system, comprising:
   a non-transitory computer readable medium on which is stored a computer program, the computer program including at least one run-time object and being executable on the computer system, the computer program having program code for performing the following:
      detecting, using an error detection arrangement, an error occurring during the execution of the run-time object;
      determining, at the error detection unit, whether the error is permanent or transient based on an error count provided by a counter;
      generating, using the error detection unit, an error handling signal when the error occurs;
      assigning an identifier to one or more run-time objects being executed on the computer system;
      selecting an error handling routine from a preselectable set of error handling routines as a function of the identifier assigned to the run-time object and the determination of whether the error is permanent or transient; and
      executing the selected error handling routine;
      wherein for each run-time object, the counter counts the number of occurring errors so that if a number of errors occur during execution of a certain run-time object, the error detection unit may infer a permanent error.

24. The computer system as recited in claim 23, wherein the computer program includes program code for performing the following:
   determining, at the error detection unit, whether the error is in hardware or software based on a trigger of the error; and
   selecting the error handling routine as a function of the determination of whether the error is in hardware or software.

25. The computer system as recited in claim 24, wherein the error detection unit determines whether it is a hardware error or a software error, taking into account which hardware unit has triggered the error.

* * * * *